United States Patent
Carlson et al.

(10) Patent No.: US 12,110,026 B2
(45) Date of Patent: Oct. 8, 2024

(54) LANE SPLIT DECISION TECHNIQUES FOR VEHICLE LATERAL CONTROL PATH PLANNING

(71) Applicants: Michael A Carlson, Davisburg, MI (US); Amy K Farris, Wayne, MI (US)

(72) Inventors: Michael A Carlson, Davisburg, MI (US); Amy K Farris, Wayne, MI (US)

(73) Assignee: FCA US LLC, Auburn Hills, MI (US)

( * ) Notice: Subject to any disclaimer, the term of this patent is extended or adjusted under 35 U.S.C. 154(b) by 185 days.

(21) Appl. No.: 17/336,642

(22) Filed: Jun. 2, 2021

(65) Prior Publication Data
US 2022/0388515 A1    Dec. 8, 2022

(51) Int. Cl.
*B60W 30/18* (2012.01)
*B60W 10/20* (2006.01)
*B60W 40/08* (2012.01)
*B60W 60/00* (2020.01)
*B60W 10/18* (2012.01)

(52) U.S. Cl.
CPC ...... *B60W 30/18163* (2013.01); *B60W 10/20* (2013.01); *B60W 40/08* (2013.01); *B60W 60/001* (2020.02); *B60W 60/0053* (2020.02); *B60W 10/18* (2013.01); *B60W 2510/202* (2013.01); *B60W 2540/20* (2013.01); *B60W 2552/00* (2020.02)

(58) Field of Classification Search
CPC .................... B60W 30/18163; B60W 60/0053
See application file for complete search history.

(56) References Cited

U.S. PATENT DOCUMENTS

| | | | |
|---|---|---|---|
| 9,340,207 B2 | 5/2016 | Nagasaka et al. | |
| 10,739,782 B2 | 8/2020 | Eagelberg et al. | |
| 2015/0321665 A1* | 11/2015 | Pandita | G01C 21/26 701/532 |
| 2017/0349212 A1* | 12/2017 | Oshida | G01L 5/221 |
| 2018/0053414 A1* | 2/2018 | Qin | B60W 50/14 |
| 2019/0054928 A1* | 2/2019 | Hatano | B60W 50/14 |
| 2022/0066467 A1* | 3/2022 | Stenneth | G05D 1/0212 |
| 2022/0306156 A1* | 9/2022 | Wray | G06V 20/588 |

FOREIGN PATENT DOCUMENTS

DE       102015112311 A1    2/2017

* cited by examiner

*Primary Examiner* — Jess Whittington
(74) *Attorney, Agent, or Firm* — Jeremy J. Klobucar

(57) ABSTRACT

Autonomous driving systems and methods for a vehicle include a driver intent determination system configured to determine a driver intent for which of two different lanes the driver intends the vehicle to follow during a lane split scenario and a controller configured to operate the vehicle according to an autonomous driving feature whereby the controller automatically controls steering of the vehicle, determine which of the two different lanes are supported for the autonomous driving feature, determine which of the two different lanes that the vehicle will follow during the lane split scenario based at least on the determined driver intent and which of the two different lanes are supported for the autonomous driving feature to obtain a target lane, and automatically control at least the steering system of the vehicle to follow the target lane.

10 Claims, 3 Drawing Sheets

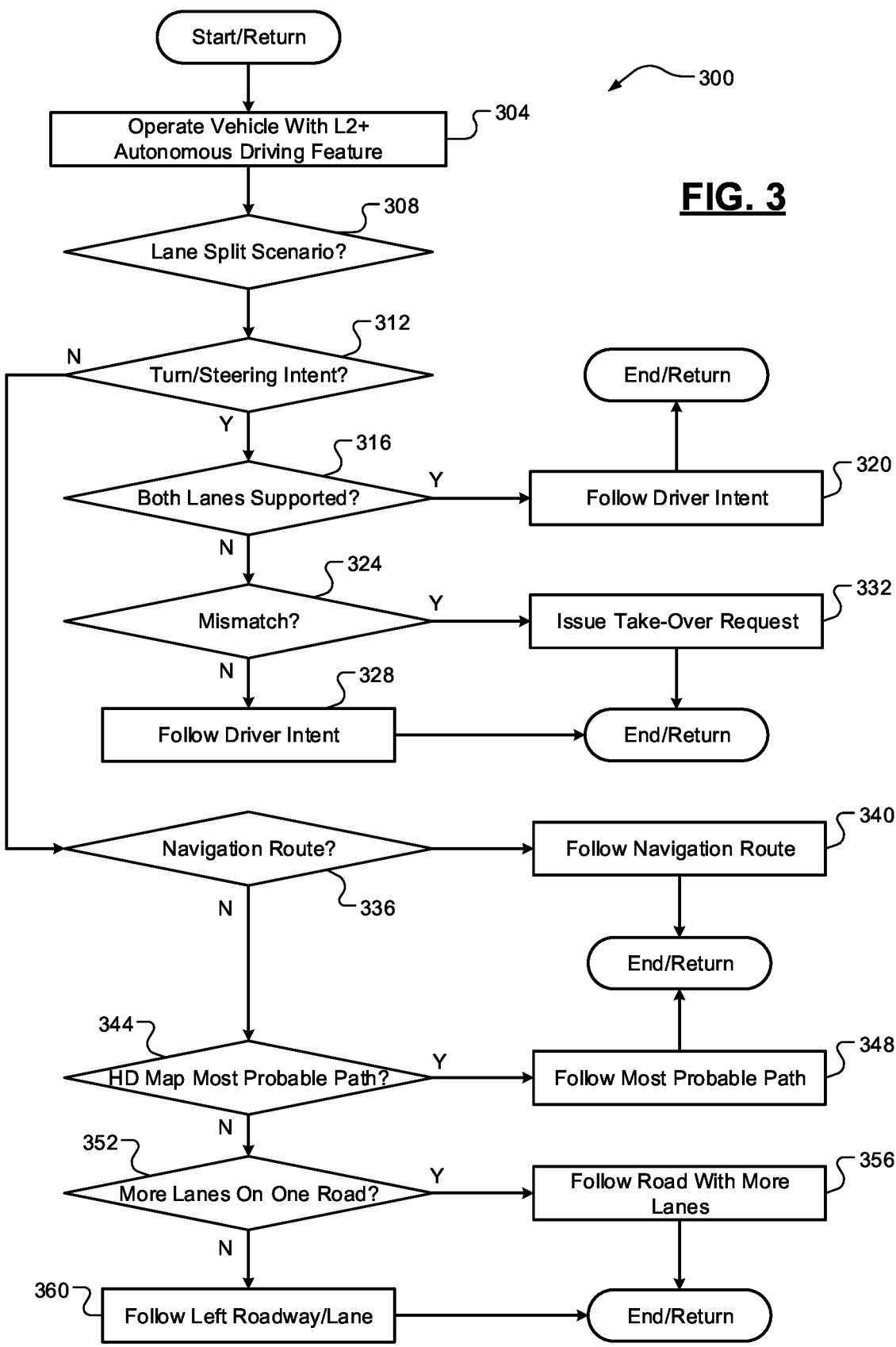

LANE SPLIT DECISION TECHNIQUES FOR VEHICLE LATERAL CONTROL PATH PLANNING

FIELD

The present application generally relates to vehicle advanced driver assistance system (ADAS)/autonomous driving features and, more particularly, to lane split decision techniques for vehicle lateral control path planning during L2+ ADAS/autonomous driving feature operation.

BACKGROUND

Autonomous driving is traditionally divided into six levels L0-L5, with L0 being no automation and L5 being full automation and L1-L4 being varying degrees of automation therebetween. L1 and L2 autonomous driving typically relates to automated driver assistance systems (ADAS) and partial automation. L3 autonomous driving relates to conditional hands-off automation, which could require a driver takeover under certain conditions. L2+ refers to the growing area between L2 and L3 autonomous driving, and one good example of L2+ autonomous driving is lane-centering assist (e.g., a combination of lane-centering and speed control or braking). In some cases, a lane could split into two different lanes veering in different directions. One good example of this scenario is a highway that diverges or splits into two separate highways.

Conventional autonomous driving systems utilize a preset navigation route/endpoint to determine which of these two different lanes the vehicle will follow while the L2+ ADAS/autonomous driving feature is enabled. This navigation-based decision, however, could conflict with the driver's intended direction for the vehicle. In addition, if no navigation route/endpoint has been preset, the conventional autonomous driving systems will require driver intervention, which could be undesirable to the driver. Accordingly, while such conventional autonomous driving systems do work for their intended purpose, there exists an opportunity for improvement in the relevant art.

SUMMARY

According to one example aspect of the invention, an autonomous driving system for a vehicle for selecting one of two different lanes during a lane split scenario is presented. In one exemplary implementation, the system comprises a driver intent determination system configured to determine a driver intent for which of the two different lanes the driver intends the vehicle to follow during the lane split scenario and a controller configured to operate the vehicle according to an autonomous driving feature whereby the controller automatically controls steering of the vehicle, determine which of the two different lanes are supported for the autonomous driving feature, determine which of the two different lanes that the vehicle will follow during the lane split scenario based at least on the determined driver intent and which of the two different lanes are supported for the autonomous driving feature to obtain a target lane, and automatically control at least a steering system of the vehicle to follow the target lane.

In some implementations, the driver intent determination system is configured to determine the driver intent based on at least one of a turn signal status and steering torque. In some implementations, when only one of the two different lanes is supported for the autonomous driving feature and the determined driver intent also indicates the supported lane of the two different lanes, the controller is configured to select the supported lane of the two different lanes as the target lane. In some implementations, when only one of the two different lanes is supported for the autonomous driving feature and the determined driver intent indicates the non-supported lane of the two different lanes, the controller is further configured to issue a driver take-over request whereby the driver must at least temporarily take over control of the vehicle.

In some implementations, when the driver intent cannot be determined and both of the two different lanes are supported for the autonomous driving feature, the controller is configured to select one of the two different lanes as the target lane according a preset navigational/directional route. In some implementations, when no navigational/directional route has been preset, the controller is configured to select one of the two different lanes as the target lane based on a most-probable path as indicated by a high-definition (HD) map database. In some implementations, when there is no most-probable path as indicated by the HD map database, the controller is configured to select one of the two different lanes as the target lane based on which of the two different lanes corresponds to a road having more total lanes than a road corresponding to the other of the two different lanes.

In some implementations, wherein when the roads corresponding to the two different lanes have equal quantities of total lanes, the controller is configured to default to selecting a left lane of the two different lanes as the target lane depending on whether the vehicle is operating in a right-side travel or left-side travel jurisdiction. In some implementations, the controller is further configured to monitor a position of the vehicle relative to a set of decision points, wherein one of the set of decision points is a final decision point after which the target lane cannot change. In some implementations, when both of the two different lanes are unsupported for the autonomous driving feature, the controller is further configured to issue a driver take-over request whereby the driver must at least temporarily take over control of the vehicle when the vehicle reaches the final decision point or reaches an earlier decision point of the set of decision points.

According to another example aspect of the invention, a lane split decision method for lateral control path planning for a vehicle when encountering a lane split scenario where a selection of one of two different lanes is necessary is presented. In one exemplary implementation, the method comprises determining, by a driver intent determination system of the vehicle, a driver intent for which of the two different lanes the driver intends the vehicle to follow during the lane split scenario, operating, by a controller of the vehicle, the vehicle according to an autonomous driving feature whereby the controller automatically controls steering of the vehicle, determining, by the controller, which of the two different lanes are supported for the autonomous driving feature, determining, by the controller, which of the two different lanes that the vehicle will follow during the lane split scenario based at least on the determined driver intent and which of the two different lanes are supported for the autonomous driving feature to obtain a target lane, and automatically controlling, by the controller, at least a steering system of the vehicle to follow the target lane.

In some implementations, the driver intent determination system determines the driver intent based on at least one of a turn signal status and steering torque. In some implementations, when only one of the two different lanes is supported for the autonomous driving feature and the determined driver intent also indicates the supported lane of the two different lanes, the controller selects the supported lane of the two different lanes as the target lane. In some implementations, when only one of the two different lanes is supported for the autonomous driving feature and the determined driver intent indicates the non-supported lane of the two different lanes, the method further comprises issuing, by the controller, a driver take-over request whereby the driver must at least temporarily take over control of the vehicle.

In some implementations, when the driver intent cannot be determined and both of the two different lanes are supported for the autonomous driving feature, the controller selects one of the two different lanes as the target lane according to a preset navigational/directional route. In some implementations, when no navigational/directional route has been preset, the controller selects one of the two different lanes as the target lane based on a most-probable path as indicated by an HD map database. In some implementations, when there is no most-probable path as indicated by the HD map database, the controller selects one of the two different lanes as the target lane based on which of the two different lanes corresponds to a road having more total lanes than a road corresponding to the other of the two different lanes.

In some implementations, when the roads corresponding to the two different lanes have equal quantities of total lanes, the controller defaults to selecting a left lane or a right lane of the two different lanes as the target lane depending on whether the vehicle is operating in a right-side travel or left-side travel jurisdiction. In some implementations, the method further comprises monitoring, by the controller, a position of the vehicle relative to a set of decision points, wherein one of the set of decision points is a final decision point after which the target lane cannot change. In some implementations, when both of the two different lanes are unsupported for the autonomous driving feature, the method further comprises issuing, by the controller, a driver take-over request whereby the driver must at least temporarily take over control of the vehicle when the vehicle reaches the final decision point or reaches an earlier decision point of the set of decision points.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIG. 3 is a flow diagram of an example lane split decision method for vehicle lateral control path planning according to the principles of the present application.

DESCRIPTION

As mentioned above, conventional autonomous driving systems utilize a preset navigation route/endpoint to determine which of these two different lanes the vehicle will follow while an L2+ ADAS/autonomous driving feature (e.g., lane-centering assist) is enabled. This navigation-based decision, however, could conflict with the driver's intended direction for the vehicle. In addition, if no navigation route/endpoint has been preset, the conventional autonomous driving systems will require driver intervention, which could be annoying to the driver. Accordingly, improved autonomous driving systems and methods for a vehicle for selecting one of two different lanes during a lane split scenario are presented. These techniques utilize a specific decision hierarchy that is primarily based on the driver's intent and therefore provides a better driver experience when road split scenarios are encountered while an L2+ autonomous driving feature is engaged.

The driver-intended lane (i.e., which of the two different lanes that the driver wishes the vehicle to travel in) is determined based on a turn signal status and/or steering input/torque. In the absence of a determinable driver intent, a best supported lane is selected. The hierarchy then continues with navigation/directions-based selection, high-definition (HD) map most probable lane selection, whichever lane continues to a road having more lanes, and lastly (default) to selecting the left lane. There could be multiple decision points at varying distances from the lane split point where the lane selection could change based on variable changes, but after a certain decision point (a point of no return) this selection may be locked. In some cases, when both lanes are determined to be unsupported, a driver take-over request may be issued. In some implementations, these techniques are geo-fence limited to certain types of roads (e.g., controlled access roads, such as highways/freeways).

Figure 1:
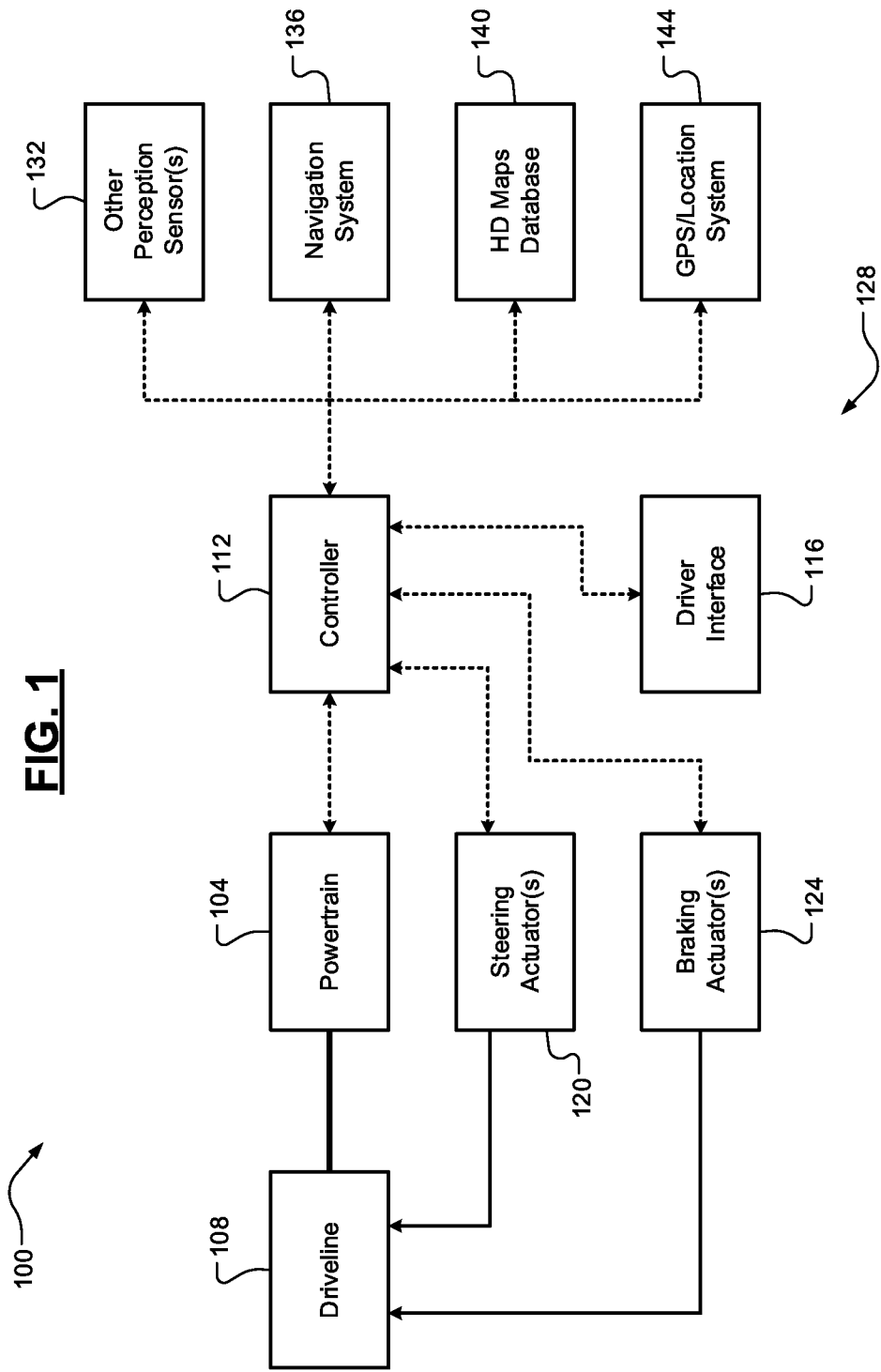
FIG. 1 is a functional block diagram of an example vehicle according to the principles of the present application.

Referring now to FIG. 1, a functional block diagram of an example vehicle 100 according to the principles of the present application is illustrated. The vehicle 100 comprises a powertrain 104 (e.g., an engine, an electric motor, or combinations thereof combined with a transmission) that is configured to generate drive torque that is transferred to a driveline 108 for vehicle propulsion. A controller 112 controls operation of the vehicle 100, including, for example, controlling the powertrain 104 to generate a desired amount of drive torque based on a driver torque request provided by a driver of the vehicle 100 via a driver interface 116 (e.g., an accelerator pedal). Other driver-controllable actuators—a set of steering actuator(s) or steering system 120 and a set of braking actuator(s) 124—are separately shown from the driver interface 116 as there are specifically utilized for L2+ autonomous driving features (e.g., lane-centering assist). The driver interface 116 could also comprise turn signal actuators that are actuatable by the driver to indicate their turn or lane change intent.

A driver intent determination system 128 of the present application generally comprises the driver interface 116 (the turn signal actuators/indicators) and the steering actuator(s) 120. The driver intent determination system 128 is configured to determine a driver intent for which of the two different lanes the driver intends the vehicle 100 to follow during the lane split scenario. It will be appreciated that the driver intent determination system 128 could include additional or other suitable actuators/systems to determine this driver intent. The controller 112 is further configured to operate the vehicle 100 according to an L2+ autonomous driving feature whereby the controller 112 automatically controls steering of the vehicle 100 (e.g., via steering actuator(s) 120). For example, the turn signal status could be indicative of the direction that the driver wishes to follow.

Alternatively, or in some combination, the driver could be providing a slight steering torque/input via a steering wheel (not shown) that is indicative of their intent to go in a certain direction during the lane split scenario. The term driver intent as used herein primarily refers to the driver's turn signal and/or steering intent, but it will be appreciated that other sources of information described below (e.g., navigation) could also be indicative of their intent.

The vehicle 100 further comprises other systems to assist in determining which of the two different lanes are supported for the L2+ autonomous driving feature (e.g., and, for a navigation-based route, could also be indicative of driver intent, such as by pre-programming a specific route). These systems can include, for example, other perception sensor(s) (e.g., cameras, RADAR, LIDAR, etc.), a navigation system 136, a high-definition (HD) maps database 140, and a global positioning satellite (GPS) or other suitable location system 144.

The controller 112 is configured to determine which of the two different lanes that the vehicle 100 will follow during the lane split scenario based at least on the determined driver intent and which of the two different lanes are supported for the L2+ autonomous driving feature to obtain a target lane. The controller 112 is then configured to automatically control at least the steering system of the vehicle to follow the target lane. The controller 112 is specifically configured to utilize a specific decision hierarchy that is primarily based on the driver's intent while also accounting for the information provided by these other systems. This specific decision hierarchy (1)-(6) will now be described in greater detail.

Figure 2:
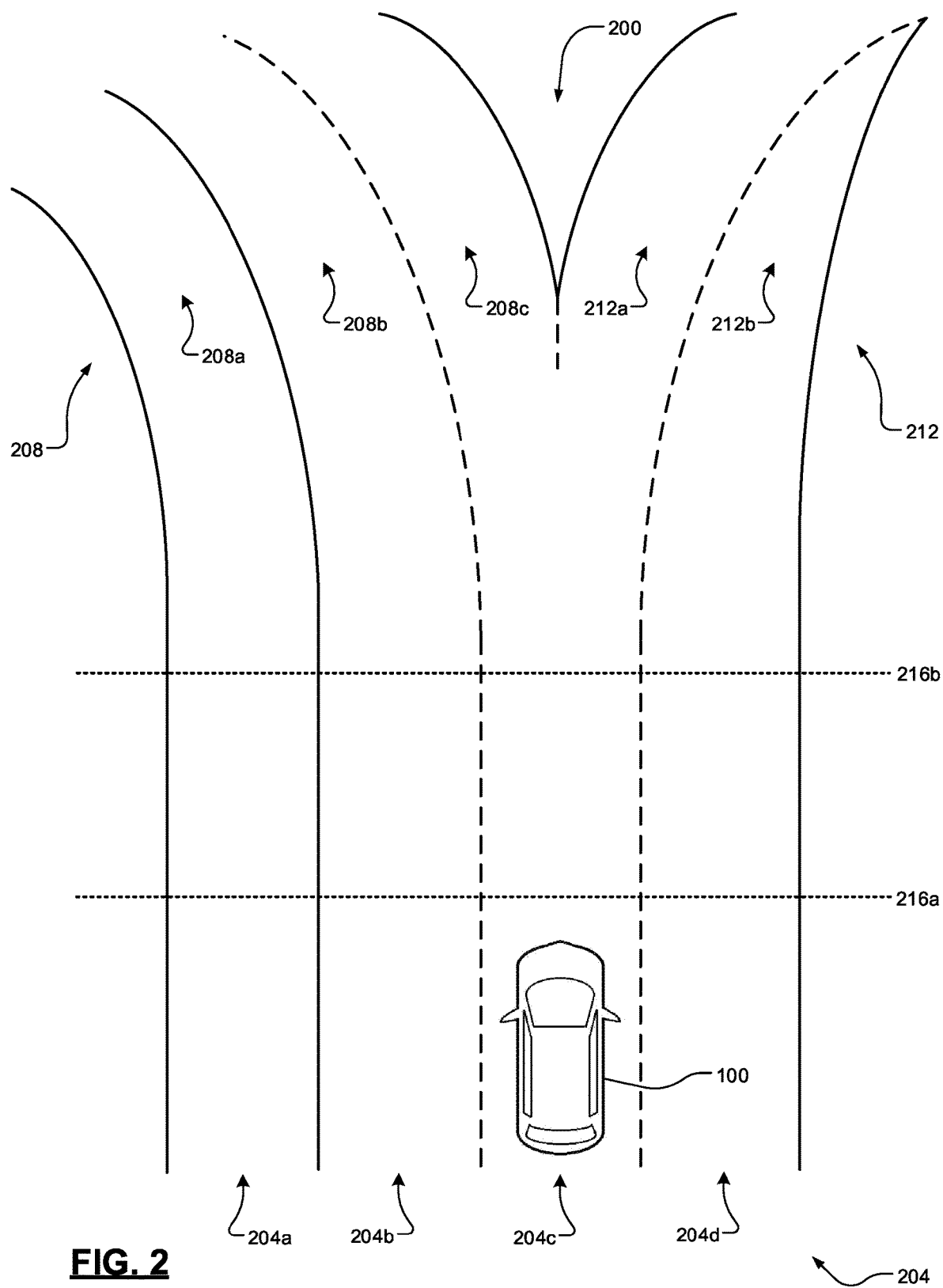
FIG. 2 is an overhead view of an example lane split decision scenario on a controlled-access road (e.g., a highway) according to the principles of the present application.

Referring now to FIG. 2 and with continued reference to FIG. 1, an overhead view of an example lane split decision scenario 200 on a controlled-access road 204 (e.g., a highway) according to the principles of the present application is illustrated. As shown, the vehicle 100 is traveling along road 204 in one of two middle lanes (204c) of four lanes 204a-204d. Ahead of the vehicle 100, it can be seen that the road 204 (and more specifically, lane 204c) splits into two separate roads 208 (left) and 212 (right). The vehicle 100 must therefore make a decision on which road to follow (lane 208c of road 208 or lane 212a of road 212). First (1), when both of the two different lanes are supported for the L2+ autonomous driving feature, the controller 112 is configured to select the driver-intended lane of the two different lanes as the target lane. Second (2), when only one of the roads is supported for L2+ autonomous driving, the system could do one of two things: (2A) when the driver-intended lane of the two different lanes is the one supported lane, that lane will be selected by the controller 112 as the target lane, or (2B) when there is a mismatch (i.e., the driver-intended lane is the unsupported lane), the controller 112 is further configured to issue a driver take-over request whereby the driver must at least temporarily take over control of the vehicle 100. In some implementations, this driver take-over request could also be issued when there is no driver input and the programmed navigational route/directions follow an unsupported roadway.

In other words, when the driver's intent (or the programmed navigational route) is to follow the unsupported lane of the two lanes, the controller 112 could demand driver intervention. This decision could be made at one of a set of decision points along the road 204 (e.g., decision points 216a and 216b) as discussed in greater detail below. For example, one of the roads 208, 212 could be a little-used or single lane road where the L2+ autonomous driving feature should not be used and thus is deemed unsupported. This could be based, for example, on geo-fencing using the HD maps database 140.

Third (3), when the driver intent (based on turn signal and/or steering torque) cannot be determined, the controller 112 is configured to select one of the two different lanes as the target lane according to preset a preset navigational/directional route, which could be provided by the navigation system 136. Fourth (4), when no navigational/directional route has been preset (i.e., when none of the above-described conditions (1), (2A)-(2B), (3) are met), the controller 112 is configured to select one of the two different lanes as the target lane based on a most-probable path (e.g., a more-likely traveled road) as indicated by the HP map database 140. Fifth (5), when there is no most-probable path as indicated by the HD map database 140 and none of (1)-(4) have been fulfilled, the controller 112 is configured to select one of the two different lanes as the target lane based on which of the two different lanes corresponds to a road having more total lanes than a road corresponding to the other of the two different lanes. As shown, this would be lane 208c of road 208 because road 208 has three lanes (208a-208c) whereas road 212 initially only has two lanes (212a and 212b) and even eventually transitions from these two lanes to only one lane (212a).

Sixth (6) and lastly, when the roads corresponding to the two different lanes have equal quantities of total lanes and none of (1)-(5) have been fulfilled, the controller 112 is configured to default to selecting a left lane of the two different lanes as the target lane (or default selecting a right lane of the two different lanes as the target lane in countries where vehicles drive on the left-side of the road). The reasoning for this default left selection is because in most countries, exit ramps and turn lanes are typically on the right side of the road. As previously mentioned, the controller 112 is further configured to monitor a position of the vehicle 110 relative to a set of decision points (e.g., decision points 216a and 216b), wherein one of the set of decision points (decision point 216b) is a final decision point after which the target lane cannot change. When both of the two different lanes are unsupported for the L2+ autonomous driving feature, the controller 112 is further configured to issue a driver take-over request whereby the driver must at least temporarily take over control of the vehicle 100 when the vehicle 100 reaches the final decision point (decision point 216b) or reaches an earlier decision point (e.g., decision point 216a) of the set of decision points.

Referring now to FIG. 3, a flow diagram of an example lane split decision method 300 for vehicle lateral control path planning according to the principles of the present application is illustrated. At 304, the controller 112 operates the vehicle 100 according to an L2+ autonomous driving feature whereby the controller 112 automatically controls at least the steering of the vehicle 100. At 308, the controller 112 determines whether a lane split scenario is upcoming. When true, the method 300 proceeds to 312. Otherwise, the method 300 ends or returns to 304. At 312, the controller 112 attempts to determine the driver intent (e.g., based on turn signal status and/or steering torque/input). When determined, the method 300 proceeds to 316. Otherwise, the method 300 proceeds to 336. At 316, the controller 112 determines whether both lanes are supported for the L2+ autonomous driving feature. When true, the method 300 proceeds to 320 where the driver-intended lane is selected and used as a target lane for the L2+ autonomous driving feature (e.g., vehicle steering/braking). When false (i.e., when only one lane is supported), the method 300 proceeds to 324. At 324, the controller 112 determines whether the driver-intended lane matches the supported lane. When true, the method 300 proceeds to 328 where the driver-intended lane is selected and used as a target lane for the L2+ autonomous driving feature and the method 300 ends or returns to 304.

When false (i.e., a mismatch), the method 300 proceeds to 332 where the controller 112 issues a driver take-over request whereby the driver must at least temporarily take over control of the vehicle 100 and the method 300 ends. This could include visual, audible, and/or haptic outputs to the driver (e.g., via the driver interface 116). At 336, the controller 112 determines whether a navigational/directional route has been preset (e.g., by the driver). When true, the method 300 proceeds to 340 where the controller 112 uses the route for a target lane for the L2+ autonomous driving feature and the method 300 ends or returns to 304. When false, the method 300 proceeds to 344.

At 344, the controller 112 determines whether a most-probable path (e.g., a most-likely road) is providable by the HD map database 140. When true, the method 300 proceeds to 348 where the controller 112 uses the most-probable path for a target lane for the L2+ autonomous driving feature and the method 300 ends or returns to 304. When false, the method 300 proceeds to 352. At 352, the controller 112 determines whether one of the two different roads has more lanes than the other. When true, the method 300 proceeds to 356 where the controller 112 uses the road with more lanes for a target lane for the L2+ autonomous driving feature and the method 300 ends or returns to 304. When false, the method 300 proceeds to 360 where the controller 112 defaults to a left-most road for a target lane for the L2+ autonomous driving feature and the method 300 ends or returns to 304.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An autonomous driving system for a vehicle for selecting one of two different lanes during a lane split scenario, the system comprising:
   a driver intent determination system configured to determine a driver intent for which of the two different lanes the driver intends the vehicle to follow during the lane split scenario and after a lane split point based on a turn signal status, steering torque, and navigational data; and
   a controller configured to:
   operate the vehicle according to an autonomous driving feature whereby the controller automatically controls steering of the vehicle;
   determine which of the two different lanes are supported for the autonomous driving feature based on a plurality of lane support features, determined by a set of vehicle systems, of the lane after the lane split point, wherein the set of vehicle systems includes at least one perception sensor, a navigation system, and a high-definition (HD) maps database;
   determine which of the two different lanes that the vehicle will follow during the lane split scenario based at least on the determined driver intent and which of the two different lanes are supported for the autonomous driving feature to obtain a target lane; and
   automatically control at least a steering system of the vehicle to follow the target lane,
   wherein when only one of the two different lanes is supported for the autonomous driving feature and the determined driver intent also indicates the supported lane of the two different lanes, the controller is configured to select the supported lane of the two different lanes as the target lane,
   wherein when only one of the two different lanes is supported for the autonomous driving feature and the determined driver intent indicates the non-supported lane of the two different lanes, the controller is further configured to issue a driver take-over request whereby the driver must at least temporarily take over control of the vehicle, and
   wherein when the driver intent cannot be determined based on at least one of the turn signal status and the steering torque and both of the two different lanes are supported for the autonomous driving feature, the driver intent determination system is configured to determine the driver intent based on the navigational data and the controller is configured to select one of the two different lanes as the target lane according a preset route specified by the navigational data.

2. The system of claim 1, wherein when no route has been preset as specified by the navigational data, the controller is configured to select one of the two different lanes as the target lane based on road usage information output by the navigation system using the HD maps database.

3. The system of claim 2, wherein when there is no road usage information output by the navigation system using the HD maps database, the controller is configured to select one of the two different lanes as the target lane based on which of the two different lanes corresponds to a road having more total lanes than a road corresponding to the non-target lane or non-selected lane of the two different lanes.

4. The system of claim 3, wherein when the roads corresponding to the two different lanes have equal quantities of total lanes, the controller is configured to default to selecting a left lane of the two different lanes as the target lane when the vehicle is operating in a right-side travel jurisdiction.

5. The system of claim 1, wherein one of the plurality of lane support features includes a geo-fence defining a boundary between (i) supported areas where lanes are supported for the autonomous driving feature and (ii) unsupported areas where lanes are not supported for the autonomous driving feature.

6. A lane split decision method for lateral control path planning for a vehicle when encountering a lane split scenario where a selection of one of two different lanes is necessary, the method comprising:
- determining, by a driver intent determination system of the vehicle, a driver intent for which of the two different lanes the driver intends the vehicle to follow during the lane split scenario and after a lane split point based on a turn signal status, steering torque, and navigational data;
- operating, by a controller of the vehicle, the vehicle according to an autonomous driving feature whereby the controller automatically controls steering of the vehicle;
- determining, by the controller, which of the two different lanes are supported for the autonomous driving feature based on a plurality of lane support features, determined by a set of vehicle systems, of the lane after the lane split point, wherein the set of vehicle systems includes at least one perception sensor, a navigation system, and a high-definition (HD) maps database;
- determining, by the controller, which of the two different lanes that the vehicle will follow during the lane split scenario based at least on the determined driver intent and which of the two different lanes are supported for the autonomous driving feature to obtain a target lane; and
- automatically controlling, by the controller, at least a steering system of the vehicle to follow the target lane,
- wherein when only one of the two different lanes is supported for the autonomous driving feature and the determined driver intent also indicates the supported lane of the two different lanes, the controller selects the supported lane of the two different lanes as the target lane,
- wherein when only one of the two different lanes is supported for the autonomous driving feature and the determined driver intent indicates the non-supported lane of the two different lanes, the method further comprises issuing, by the controller, a driver take-over request whereby the driver must at least temporarily take over control of the vehicle, and
- wherein when the driver intent cannot be determined based on at least one of the turn signal status and the steering torque and both of the two different lanes are supported for the autonomous driving feature, the driver intent determination system determines the driver intent based on the navigational data and the controller selects one of the two different lanes as the target lane according a preset route specified by the navigational data.

7. The method of claim 6, wherein when no route has been preset as specified by the navigational data, the controller selects one of the two different lanes as the target lane based on road usage information output by the navigation system using the HD maps database.

8. The method of claim 7, wherein when there is no road usage information output by the navigation system using the HD maps database, the controller selects one of the two different lanes as the target lane based on which of the two different lanes corresponds to a road having more total lanes than a road corresponding to the non-target lane or non-selected lane of the two different lanes.

9. The method of claim 8, wherein when the roads corresponding to the two different lanes have equal quantities of total lanes, the controller default to selecting a left lane of the two different lanes as the target lane when the vehicle is operating in a right-side travel jurisdiction.

10. The method of claim 6, wherein one of the plurality of lane support features includes a geo-fence defining a boundary between (i) supported areas where lanes are supported for the autonomous driving feature and (ii) unsupported areas where lanes are not supported for the autonomous driving feature.

* * * * *